United States Patent [19]

Goodes et al.

[11] Patent Number: 5,658,544
[45] Date of Patent: Aug. 19, 1997

[54] GAS-SOLID CONTACTING METHOD

[75] Inventors: Christopher Geoffrey Goodes; Grant Ashley Wellwood, both of Mill Park; Anthony Rudland Kjar, Blackburn; Robert Francis Still, East Malvern, all of Australia

[73] Assignee: Comalco Aluminium Limited, Melbourne, Australia

[21] Appl. No.: 316,853

[22] Filed: Oct. 3, 1994

Related U.S. Application Data

[63] Continuation-in-part of Ser. No. 966,174, filed as PCT/AU91/00342 Aug. 2, 1991, abandoned.

[30] Foreign Application Priority Data

Aug. 3, 1990 [AU] Australia ................... PK1558

[51] Int. Cl.[6] .................. B01D 53/50; B01D 53/68
[52] U.S. Cl. .......... 423/230; 423/210; 423/240 S; 423/244.01; 423/244.07; 95/131
[58] Field of Search ................ 95/131; 96/150, 96/152, 151; 423/240 S, 210, 230, 244.01, 244.07

[56] References Cited

U.S. PATENT DOCUMENTS 3,760,565  9/1973  Fish ............................ 95/131
4,176,019  11/1979  Dethloff ....................... 96/150

FOREIGN PATENT DOCUMENTS

1416344  12/1975  United Kingdom ............ 423/240 S
92-02289  2/1992  WIPO .

*Primary Examiner*—Steven Bos
*Assistant Examiner*—Peter T. Di Mauro
*Attorney, Agent, or Firm*—Nikaido Marmelstein Murray & Oram LLP

[57] ABSTRACT

A process for removing a carbon dioxide, HF or sulfur dioxide contaminant from an exhaust gas stream containing that contaminant comprising providing a gas stream to a reaction zone, the gas stream entering the reaction zone from underneath and being caused to flow through the reaction zone with components of velocity in substantially upwards and circumferential directions; contacting the gas stream in the reaction zone with particulate material to adsorb the contaminant on the particulate material, wherein the flow of gas in the reaction zone causes a dispersed toroidal bed of particulate material to be formed in the reaction zone; the slip velocity of the gas stream relative to the particulate material in the toroidal bed is greater than 1 m/s; and entraining a fine fraction of the particulate material in the gas stream whereby the fine fraction is removed from the toroidal bed by the gas stream exiting the bed; and separately recovering a coarse fraction of the particulate material from the reaction zone.

20 Claims, 9 Drawing Sheets

GAS-SOLID CONTACTING METHOD

This application is a continuation-in-part of U.S. Ser. No. 07/966,174, filed Mar. 26, 1993, now abandoned, which is a 371 of PCT/AU91/00342 filed Aug. 2, 1991.

The present invention relates to the treatment of exhaust gas streams and in particular to the removal of contaminants in such streams by adsorption on a solid adsorbent. The process of the present invention is particularly suitable for the removal of acid contaminants from exhaust gas streams.

An example of a gaseous component in a gas stream which may be removed by solid contact is found in the electrolytic production of aluminum. Gaseous fluorides and particularly hydrogen fluoride are present in a potline exhaust gas as an inevitable consequence of the smelting process. If vented to the atmosphere these gases represent a net loss of fluorides from the process which is important from an economical point of view. Minimizing the fluoride release is also important from an environmental point of view.

Gaseous fluorides are presently removed from exhaust gases by a dry scrubbing technique. This involves contacting the raw potline exhaust gas with alumina particles and the gaseous fluorides are chemisorbed and/or physisorbed onto the surface of the alumina. The alumina is then collected in a baghouse, together with any entrained particulates originally in the exhaust gas.

In such dry scrubbing techniques, primary contact between the alumina and the exhaust gas can take place in two types of reactors—one type being known as a transport reactor.

In a transport reactor, the primary alumina is injected into a low to moderate velocity gas stream before being separated. The particulates are injected into the gas stream and are entrained by and flow along with the gas stream. Accordingly, the velocity of the particulates relative to the gas stream is small.

Although such reactors are very simple, they are relatively inefficient gas-solid contacters and a recycle (up to 20 times) is generally employed to achieve the desired scrubbing levels. The high recycle results in high attrition of the alumina particles due to excessive handling and as particle size is an important parameter in aluminum pot feeds, control problems in the potline may arise because of excessive fine material. In this type of reactor, the high recycle rate also compounds the amount of material sent to the bagfilter as all solids admitted to the process are separated in the bagfilter.

Furthermore, a high recycle rate makes predicting and controlling the rate of fluoride sorption onto the alumina difficult.

The other type of reactor uses a conventional fluidized bed system. Such a system involves large initial capital costs, requires a large plan area and because of the large pressure drop across the bed, a high operating cost can be expected.

In both types of reactor, all the alumina and any fume present in the exhaust gas is ultimately fed to the cell and so the impurities (carbon, trace metals and other particulates in the exhaust gases) are also recycled to the electrolytic cell.

With both of these systems, in practice, it has been found that a large proportion (usually 100%) of the freed inventory for the electrolytic cell must be contacted with the exhaust gas stream to effectively reduce the fluoride concentration to a respectable level. As a result of the impurities in the gas stream and their recycle the overall quality of the feed to the pots is reduced.

It is an object of this invention to improve the efficiency of the gas-solid contact, so that a smaller proportion of the alumina inventory can be used to reduce the fluoride levels in the potline exhaust gas.

The objectives of any dry scrubbing operation is to adsorb or chemisorb the gaseous contaminants in an exhaust gas stream onto particulate material at the highest possible rate and attain the highest possible loading of contaminant on that particulate material. From a commercial point of view, this should be done by minimizing the operating costs associated with the contacting of gas and solid.

Conventional wisdom has it that improved scrubbing efficiency is obtained by maximizing the contact time between the solid adsorbent and the gas stream in the contacting vessel. For example, U.S. Pat. No. 4,176,019 by Dethloff describes a process and apparatus for the sorption of reactive gaseous components from a gas stream. The process comprises introducing a tangential gas stream to the bottom of a cylindrical vessel. The gas stream flows upwardly through the cylindrical vessel in a generally spiral flow pattern and is removed axially from the top of the chamber. A solid particulate adsorbent is introduced at the top of the chamber and adjacent the periphery of the chamber. The particulate material flows generally downwardly through the cylindrical chamber (most likely by flowing down along the wall of the chamber) and is removed from the bottom of the chamber.

At column 2, lines 63–68, Dethloff states that the procedure of the present invention is known to allow increased time of contact to be maintained between the solid particles and the gas stream and this leads to improved efficiency of sorption of hydrogen fluoride. Therefore, Dethloff is directed towards a process that provides a longer contact time between the solids and the gas than is possible in alternative scrubbing systems.

The gas phase mass transfer co-efficient and hence mass transfer rate is very much dependent on the resistance to mass transfer of the diffusion boundary layer around the particle. If the boundary layer is reduced considerably by a high slip velocity (relative velocity between particle and gas in the reaction zone) in the mass transfer is then dependent on the adsorption or chemisorption rate at the particle surface. Generally, this results in the mass transfer proceeding at a much faster rate. Therefore, for a relatively short residence time, the adsorption process can substantially reach equilibria with the particulate material approaching its saturation limit for the gaseous component, before being removed. Consequently, less particulate material is required to handle the same loadings in the gas phase.

The present inventors have found that if the particulate material is contacted with a high velocity exhaust gas stream, so that the slip velocity in the reaction zone is higher than that found in prior art reactors the effect of diffusion to the particle surface is minimized and its contribution to the overall rate of sorption is negligible.

In accordance with the objectives the invention thus provides a process for removing acid contaminant from an exhaust gas stream comprising providing said gas stream to a reaction zone, said gas stream entering said reaction zone from underneath and being caused to flow through said reaction zone with components of velocity in the upwards and circumferential directions;

contacting said gas stream in said reaction zone with particulate material to adsorb said acid contaminant on said particulate material, said particulate material having particle sizes predominantly below 190 μm and wherein the flow of gas in said reaction zone causes a toroidal bed of particulate material to be formed in said reaction zone, said toroidal bed of particulate material being highly dispersed;

wherein the slip velocity of said gas stream relative to said particulate material in said toroidal bed is greater than 1 m/s;

entraining a fine fraction of said particulate material in said gas stream whereby said fine fraction is removed from said toroidal bed by said gas stream exiting said bed; and recovering a coarse fraction of said particulate material from the reaction zone.

Preferably, prior to the scrubbing operation substantially all of the solid material entrained in the exhaust gas (as a result of the process that formed the exhaust gas) is removed from the gas stream.

It has been found that, proportionally, treated fine particulate material (preferably less than 45 μm) contains a larger amount of other contaminants (such as trace metals) than treated coarser particulate material.

Thus it is preferred that a fine fraction of particulate material is elutriated from a coarse fraction by the gas stream. The fine fraction of particulate material is entrained by the gas stream and exits the reaction zone with the gas stream. The coarse fractions are recovered from the toroidal bed, preferably by removal through a conduit beneath said reaction zone and initially extending axially from said reaction zone.

This process has the advantage that only the fine fraction is carried over with the gas stream to the baghouse thus reducing the solids loading on the bag filter and reducing the cost of operating such equipment. Moreover, the fine particles with a high concentration of such impurities as trace metals, are removed from the system or can be treated separately.

If the impurity level in the treated alumina is to be reduced further, it is preferable that substantially all the solids in the exhaust gas stream be removed prior to contact with the adsorbing particulate material.

Preferably, the contacting process is carried out in an apparatus with the gas stream entering from beneath the reaction zone. The entering exhaust gas stream preferably enters the bottom of the reaction zone at an angle inclined to the axis of the reaction zone such that the gas stream is imparted with components of velocity in both the upwards and circumferential directions as it progresses through the reaction zone. More preferably, the gas stream flows through a set of angled vanes as it enters the reaction zone. The set of angled vanes acts to impart the gas stream with both circumferential and upward components of velocity as it flows through the reaction zone. The set of angled vanes may be considered to form the bottom of the reaction zone.

As the gas stream is of a high velocity the resulting slip velocity of the gas stream relative to the particulate material is high, preferably greater than 1 m/s, the boundary layer is minimized and the reaction takes place rapidly on the surface of the material. Thus very little contact time is required for adsorption of an acid contaminant in the gas stream on the particulate material to reach equilibria.

The treated coarse fraction of particulate material may be taken off after a predetermined residence time and the fine material allowed to be carried over with the gas stream.

The toroidal bed of particulate material formed in the reaction zone is quite compact and the residence time of the gas stream in this bed (and hence the contact time between the gas stream and solid adsorbent) is quite small relative to conventional gas-solid contacters. The average contact time between a particle and the gas stream is from about 2 minutes to about 10 minutes. This time is equivalent to the residence time of the particles in the contacter. The process of the invention is operated under conditions that retain the particles in the contacter for a relatively long period in order to allow the amount of acid contaminant adsorbed on the alumina to approach the maximum or equilibrium amount.

The gas stream has an average residence time in the reaction zone of up to 0.5 seconds and, in preferred modes of operation, gas residence times of from 0.01 to 0.10, more preferably 0.01 to 0.02 seconds are found. These gas residence times are extremely short and it is surprising that effective removal of acid contaminants from the gas stream can be achieved with such short periods of contact between the gas stream and the particulate material.

The particulate material used in the process of the present invention should have a particle size distribution such that the particles are sized predominantly below 190 μm. For example, at least 95% by weight of the particles are under 190 μm, more preferably at least 90% by weight are under 190 μm. The median particle size, $d_{50}$, of the particulate material is generally in the range of about 70 μm to about 100 μm, more preferably about 85 μm. For such particles, the terminal velocity of the particles is in the order of 1 m/sec.

Although the terminal velocity of the particles added to the reaction zone is of the order of 1 m/sec, it has surprisingly been found that gas velocities in the reaction zone can substantially exceed this value without having the toroidal bed of particles blown out of the reaction zone by the gas stream. The reasons for this are not fully understood, although the fact that the gas flowing through the reaction zone has a circumferential velocity component and inter-particle interactions in the toroidal bed are believed to contribute to this phenomenon.

As stated above, the particulate material forms a compact toroidal bed in the reaction zone. Even though the bed of particles is compact (i.e. of small height), the bed is highly dispersed, with bed voidage being in the range of at least 0.950 and frequently within the range of about 0.9997 to about 0.9999.

The apparatus used in the process of the present invention acts as a crossflow reactor. Given that the actual bed mass is small, conventional wisdom has it that such an arrangement would be total unsuitable for use in the scrubbing of gases. The present inventors have found that efficient mass transfer and removal of hydrogen fluoride from the exhaust gas does occur in the process of the present invention. This is a surprising and unexpected result given that the contact times between the gas and the solids in the present process are low and given industrial practice which seeks to prolong contact time in order to increase efficiency.

The process of the present invention is suitable for the scrubbing of acid contaminants from exhaust gas streams containing such contaminants. Examples of acid contaminants that may be removed from gas streams by the present process include hydrogen fluoride, sulphur dioxide and carbon dioxide.

The particulate material used as in the process is selected such that a particulate material that adsorbs the desired acid contaminant is chose. For example, alumina is a suitable adsorbent for the scrubbing of hydrogen fluoride. Lime is a suitable adsorbent for sulphur dioxide. If the exhaust gas stream contains a number of acid contaminants, the adsorbent material may act as an adsorbent to all the acid contaminants or a mixture of adsorbent materials may be used.

The process of the present invention is particularly suitable for removing hydrogen fluoride from an exhaust gas stream of an aluminum smelter. Alumina is used as the adsorbent, with conventional scrubbing practices at aluminum smelters utilizing feedstock alumina (also known as primary alumina) as the adsorbent. After being used as the adsorbent in the scrubbing process, the alumina is fed to the aluminum smelting pots.

It has been found that proportionally, treated fine particulate material (preferably less than 45 82 m) contains a larger amount of trace metals than treated coarser particles. Thus the compounding effect of adding impurities in the treated alumina used as feed, can be reduced if the finer particles are elutriated from the treated coarser alumina particles.

This has additional benefits as the fine material has been linked with occupational health problems for people working in the vicinity of the smelter pots.

BRIEF DESCRIPTION OF THE DRAWINGS

The foregoing and other features objects and advantages of the present invention will become more apparent from the following description of the preferred embodiments and accompanying drawings in which.

The scrubbing process of the present invention will now be described with reference to the removal of fluorides and trace metals such as vanadium, nickel, gallium and iron from the exhaust gases of an aluminum refining cell.

Figure 1:
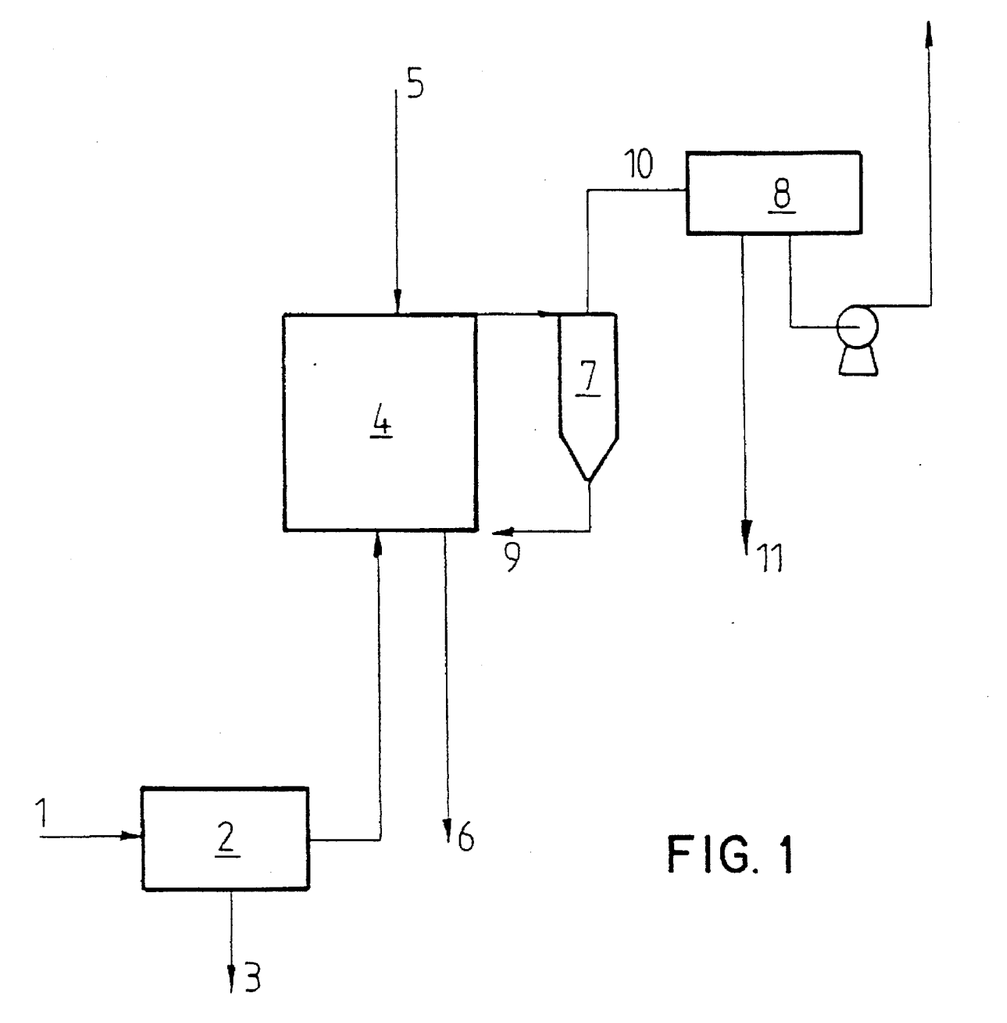
FIG. 1 is a process flow diagram of a dry scrubbing system incorporating an embodiment of the process of the invention.

In the overall process flow diagram shown in FIG. 1, the raw cell exhaust gas 1 may first be passed through a solids removal stage 2 to remove, as stream 3, any particular material such as silica, alumina or carbon which may be entrained in the gas stream. This stage can be series of cyclones or multi-clones or other dust separation devices.

The gas stream is then passed to the reactor 4 where fluorides are adsorbed or chemisorbed onto the surface of the primary alumina 5. A coarse fraction 6 of treated alumina is then removed and mixed with the feed to an aluminum refining or smelting operation. A finer fraction may then be carried with the gas stream through a baffle 7 to separate the larger of the entrained particles before being passed to the baghouse 8. The larger particles 9 in the fine fraction may be returned to the reactor and the remainder 10 are passed to the baghouse for separation from the gas stream as particles stream 11. The particles removed at stream 11 generally have a particle size less than about 45 microns, preferably less than about 20 microns and most preferably less than about 10 microns. Trace impurities, which are believed to enter the dry scrubbing process as fine particles of condensed fume that originate in the hooded space of the electrolysis cells, report to the fine fraction and are removed by the gas stream leaving the.

If sufficient control can be maintained over the size the particles removed from the reactor as a fine fraction, then a baffle system may not be required.

Figure 2:
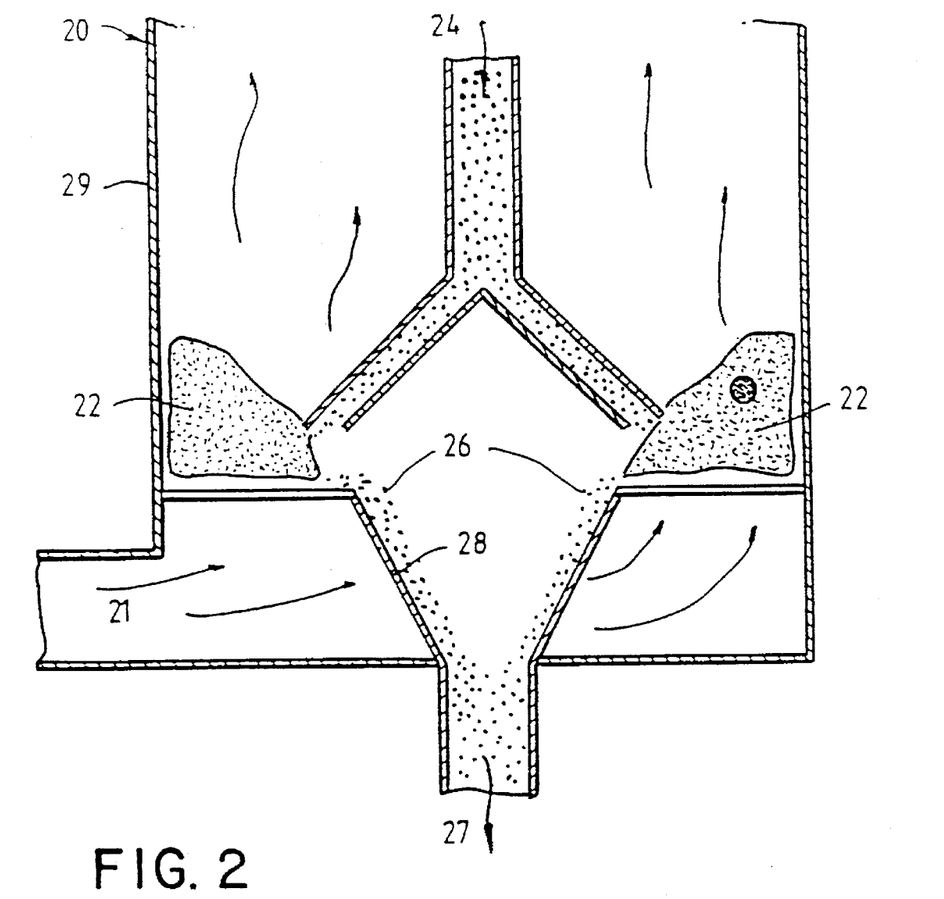
FIG. 2 is a schematic view of an apparatus for carrying out an embodiment of the process of the invention.
Figure 3:
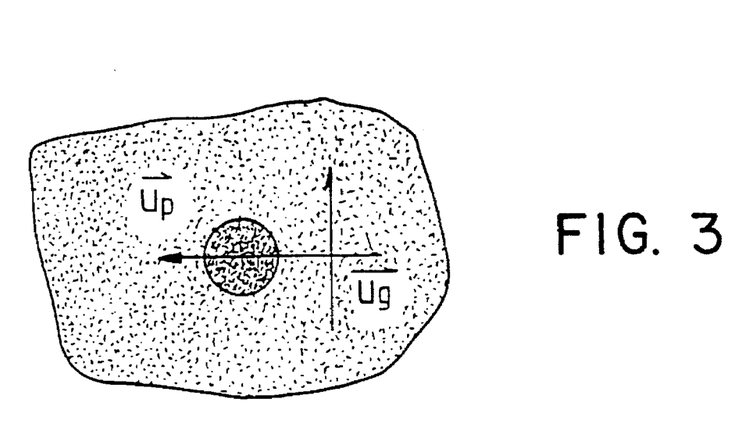
FIG. 3 is a schematic diagram showing the relative velocities of the gas stream and a particle in the reaction zone.
Figure 4:
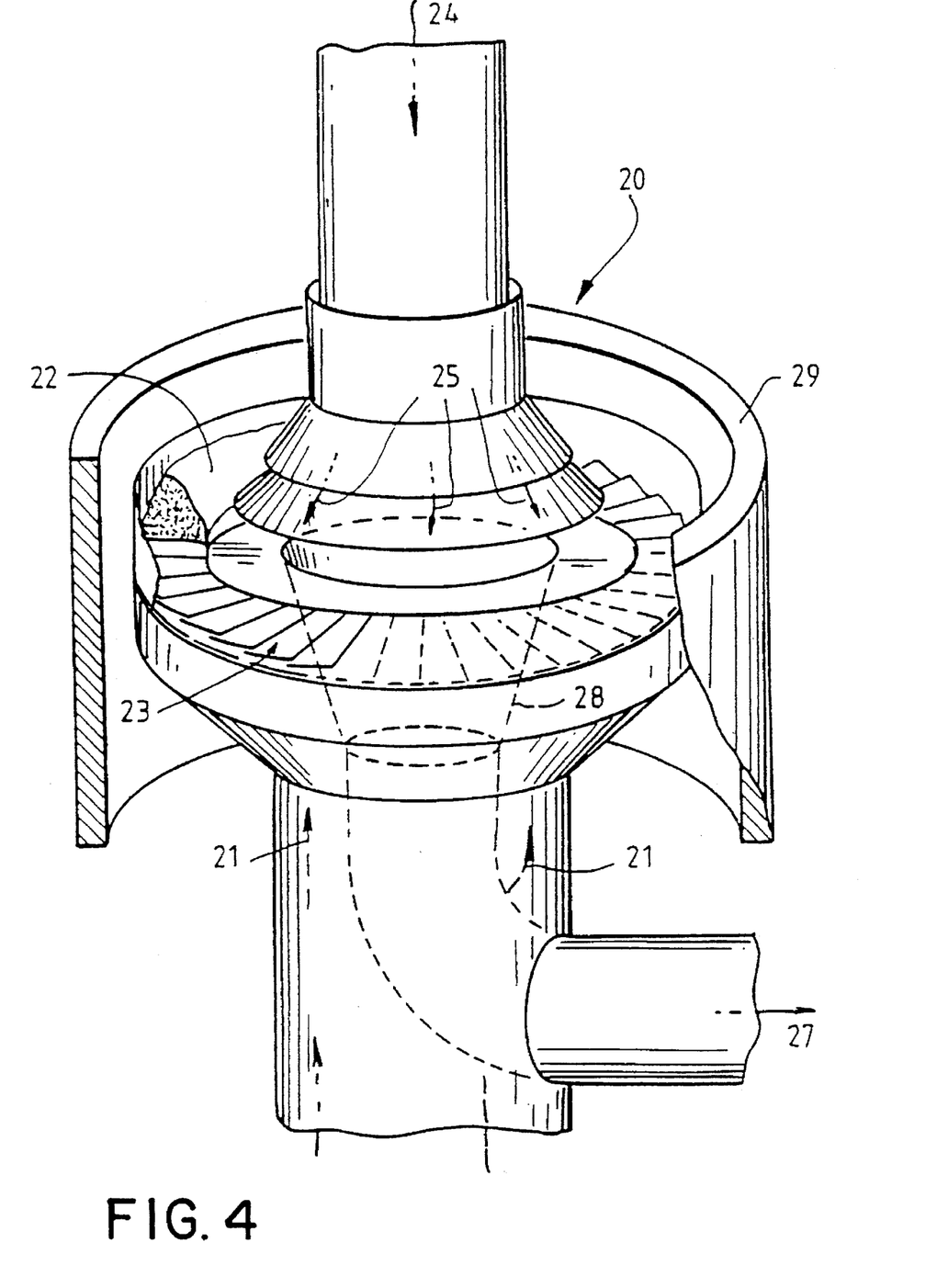
FIG. 4 is a sectional perspective view of an apparatus for carrying out the process in accordance with an embodiment of the invention.

In the apparatus 20 for carrying out the process of the invention as shown in FIGS. 2 and 4, a fluoride containing exhaust gas stream 21 enters the reactor in the direction of the arrows shown. The bottom of a toroidal reaction zone 22 comprises a number of intake guides 23 which direct the incoming high velocity exhaust gases in a direction at least 80° to the axis of the reaction zone so that the gases move in a direction which is substantially circumferential to the reaction zone 22. The gases thus create a swirling motion in the processing zone of the reactor 20 about the axis of the reaction zone 22.

Alumina is fed into the reactor in a countercurrent direction via axial conduit 24 which has a diverging conical feeder to provide a uniform distribution of particulate material in the gas stream before entering the toroidal reaction zone at 25.

As the particles are contacted with the gas flow, the swirling motion of the gas stream and the slip velocity of the gas stream relative to the particles causes a shearing or disruption of the diffusion boundary layer as discussed later. The particles initially are moved to the outside of the reaction zone 22 by centrifugal force but as more particles are fed into the reactor, the reaction zone fills and the treated particles are forced to the inside of the reaction zone. The treated particles which have completed the sorption process are taken from the reactor via conduit 28 as stream 27 to be mixed with the refining cell or smelter pot feed.

The walls of the reactor 29 can extend upwardly from those shown in FIG. 4 and taper outwardly (not shown) to keep the finer particles entrained until processed as in FIG. 1.

As discussed earlier, when the alumina particles enter the reaction zone, the difference between the velocity of the particles and the velocity of the gas known as the slip velocity is large enough to shear or disrupt the surrounding diffusion boundary layer around the particle. This is illustrated in FIGS. 5, 6 and 7.

Figure 5:
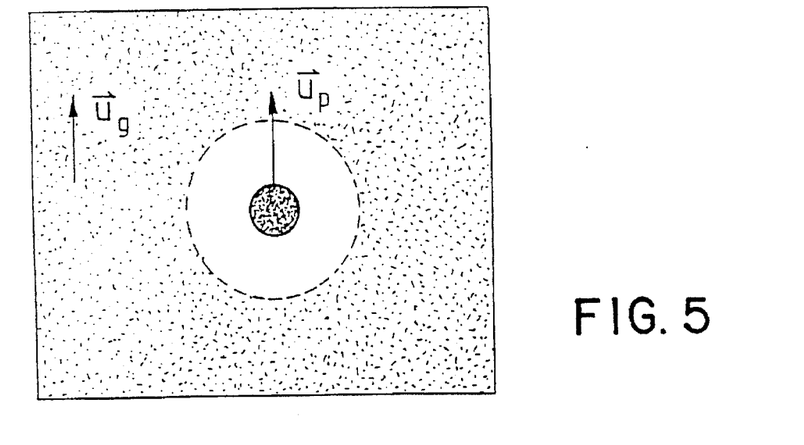
FIGS. 5 to 7 are schematic diagrams illustrating the diminishing of the diffusion boundary layer around the particle as the slip velocity increases.

In FIG. 5, the velocity of the particle is roughly the same as the gas velocity. This results in a slip velocity approaching zero and corresponds to a scrubbing operation performed in a transport reactor. As can be seen in the drawing, the diffusion boundary layer is large and as a consequence high gas phase resistance results.

Figure 6:
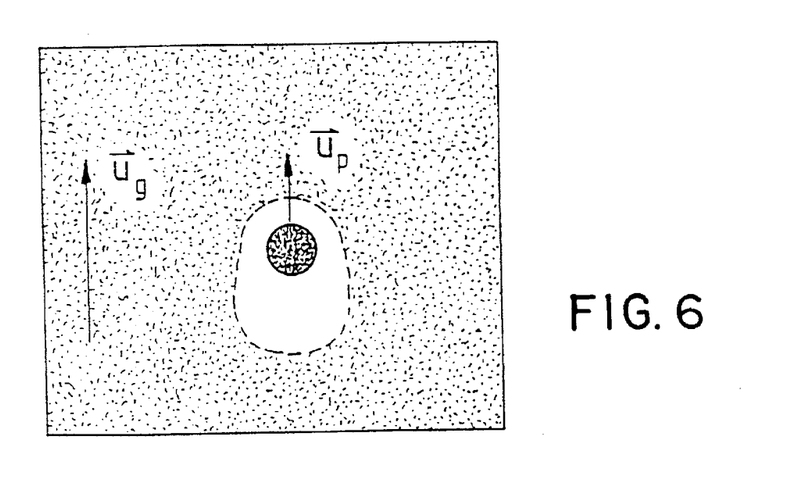

In FIG. 6 the slip velocity has increased resulting in a lower diffusion boundary layer resistance and faster gas phase mass transfer. This situation is analogous to a fluidized bed reactor and although improving the scrubbing operation, the higher capital and operating costs detract considerably from the appeal of this type of reactor.

Figure 7:
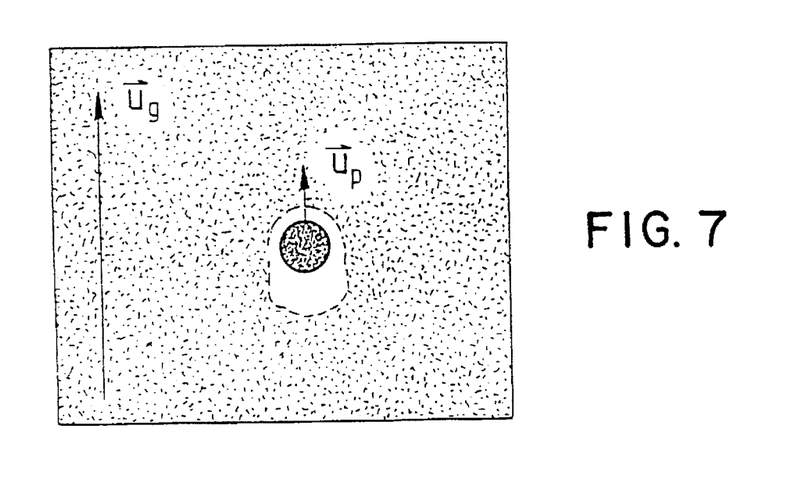

When the gas velocity is much greater than the particle velocity as shown in FIG. 7, the boundary layer diffusion resistance is greatly reduced. The particles which have a substantially zero velocity in the direction of gas flow and a slip which have a substantially zero velocity in the direction of gas flow and a slip velocity above about 1 meter per second provide sufficiently low resistance to gas phase mass transfer to achieve effective gas scrubbing. Although the velocity of the gas may not be large enough to remove all the boundary layer, a sufficient amount of the boundary layer is removed or disrupted so that the contribution of the rate of diffusion of fluorides to the particle in the overall reaction rate is greatly reduced. Thus the rate determining step in the overall reaction is the adsorption or chemisorption of the fluorides on to the surface of the alumina.

As the reaction between fluorides and alumina is both rapid and complete, the contact with alumina can be conducted in a single pass. To handle the large volumes of exhaust gas produced in an aluminum smelter, it is likely that a bank of reactors can be set up in parallel. A typical dry scrubbing operation of gaseous fluorides from smelter pot exhaust gas must be capable of handling $2-3\times10^6$ $Nm^3/hr$ with a concentration of 100–400 ppmHF.

Figure 8:
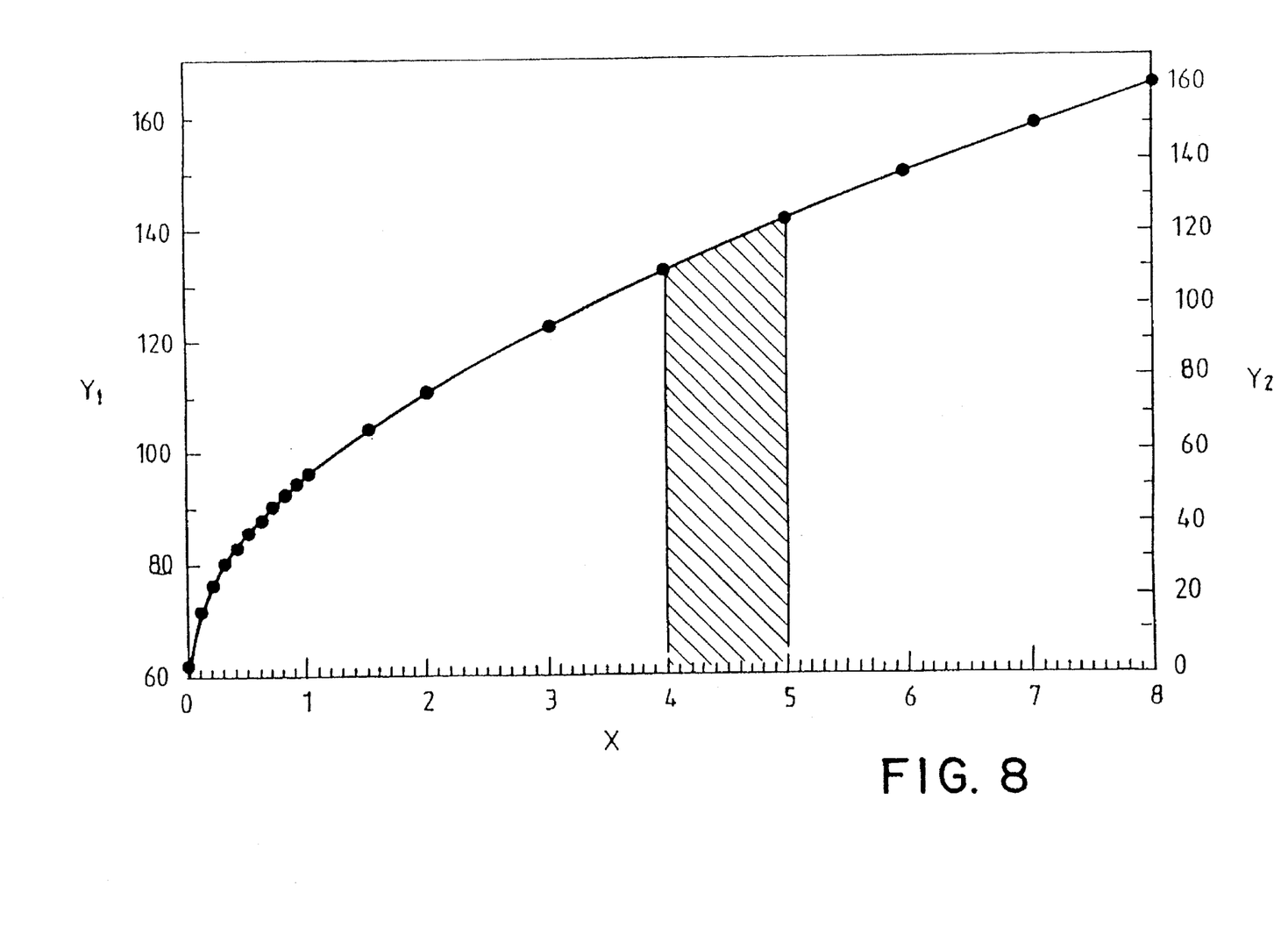
FIG. 8 is a graph showing the effect slip velocity has on mass transfer rate and the relative improvement in the reaction rate.
Figure 9:
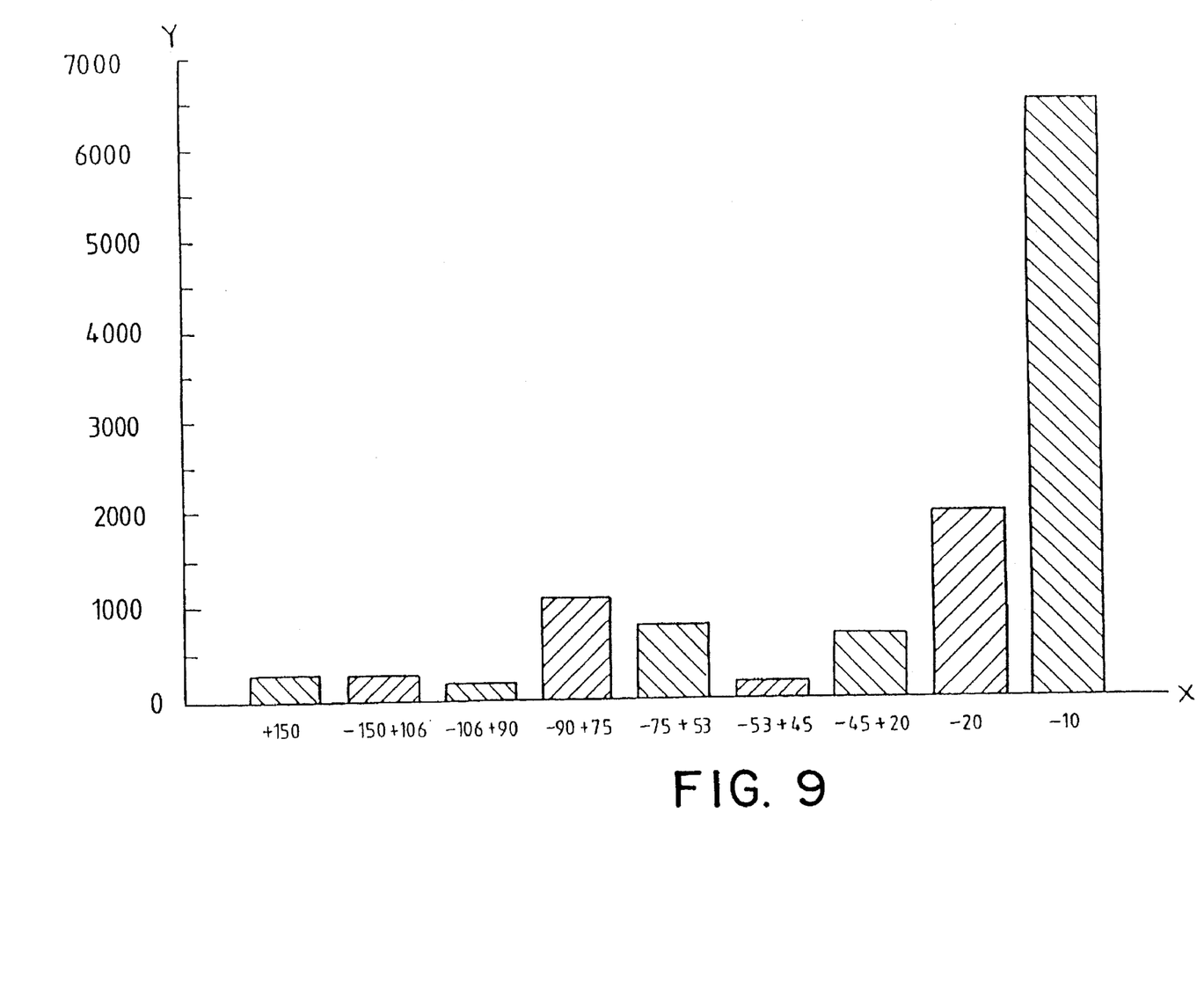
FIGS. 9, 10, 11 and 12 are graphs showing the amounts of iron, vanadium, nickel and gallium, respectively, adsorbed or chemisorbed onto alumina as a function of particle size.
Figure 10:
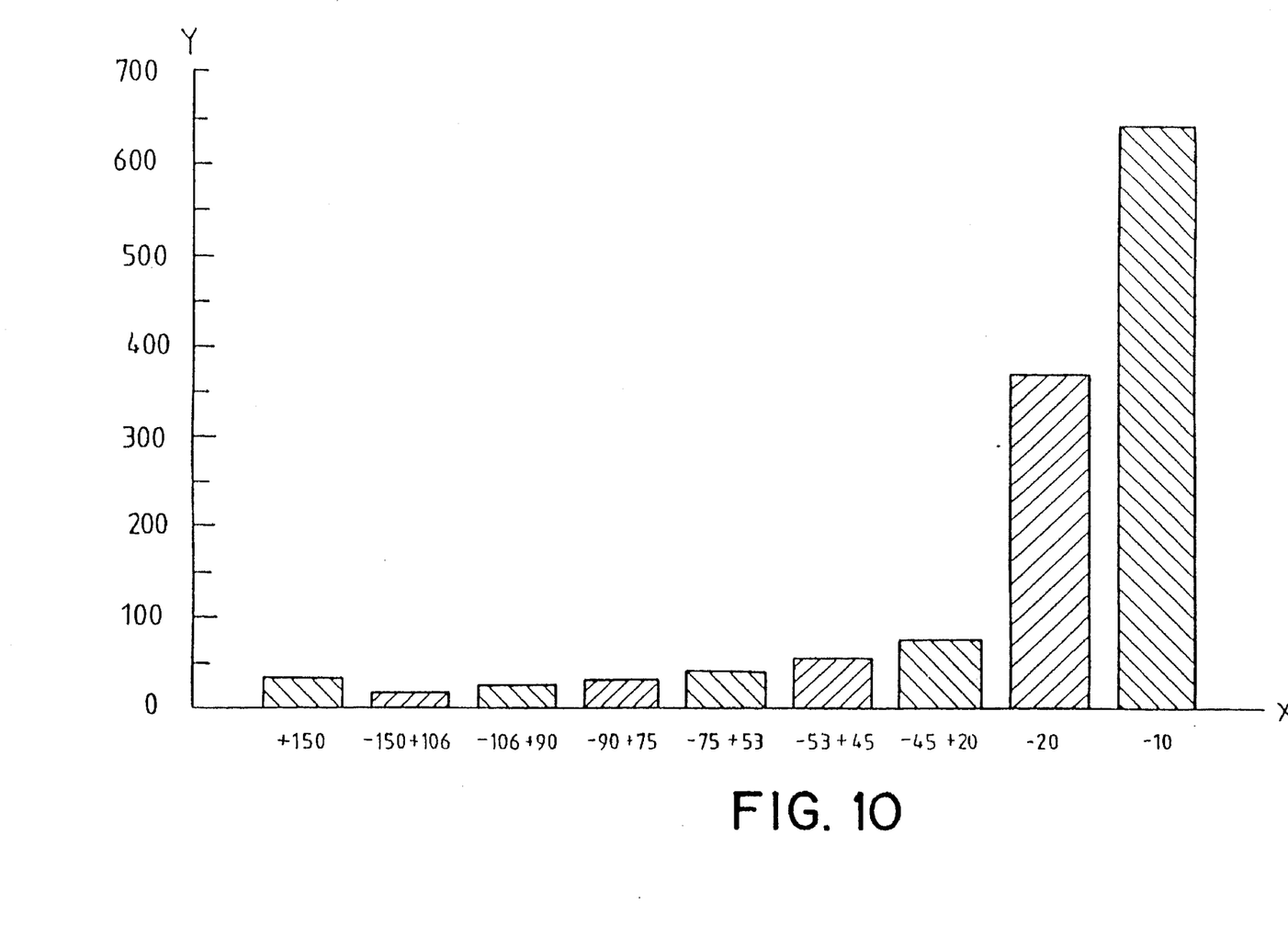
Figure 11:
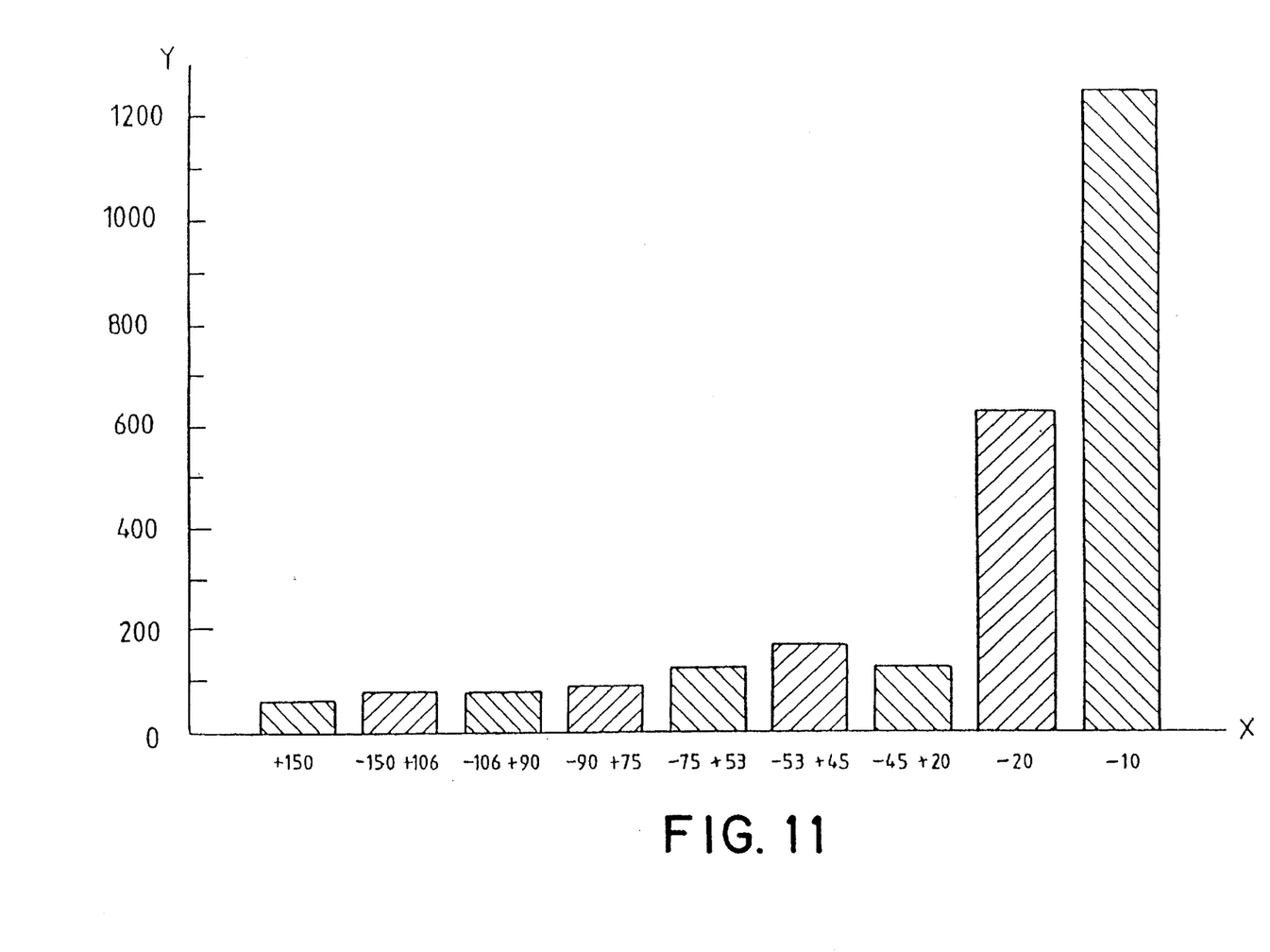
Figure 12:
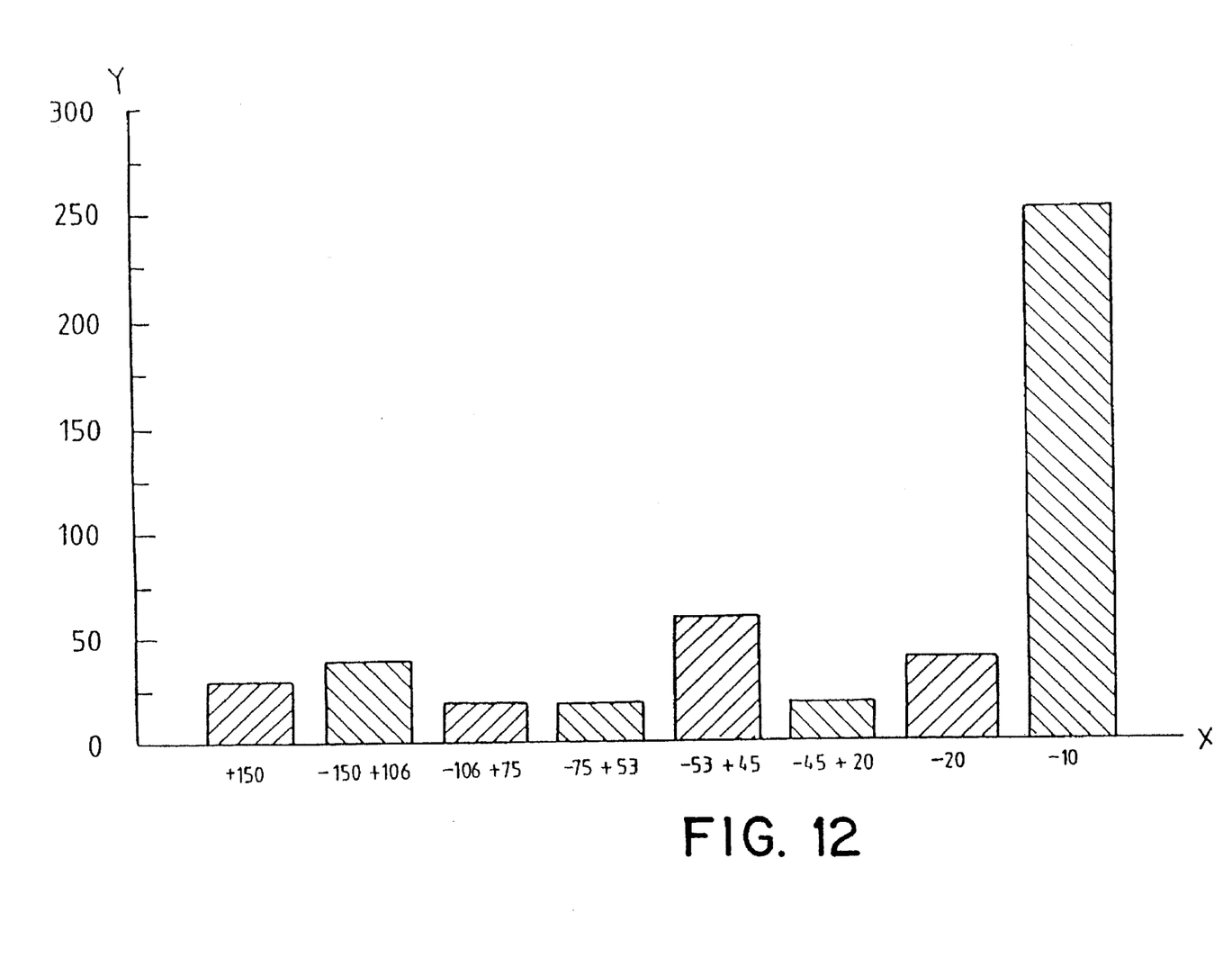

FIG. 8 is a graph of slip velocity in m/s on the X axis, mass transfer co-efficient in centimeters per second on the Y1 axis and percentage relative improvement in reaction rate on the Y2 axis.

A fluidized bed gas scrubber has a slip velocity of typically 0.6 m/s whereas a transport reactor has slip velocity of less than 0.1 m/s. Therefore the benefits in operating at a slip velocity of greater than 1 m/s are clearly evident from FIG. 8.

For gas scrubbing operations carried out in accordance with the invention, and preferably in a toroidal reaction zone, slip velocities between preferably 4 to 5 m/s can be used with the consequent increase in scrubbing efficiency. As discussed earlier, by using a toroidal reaction zone, the apparatus can be operated to allow a fine fraction of the alumina to be carried over with the gas stream or later recover. Furthermore, the pressure drop across a toroidal reaction zone of 1 m diameter is 10–30 mm $H_2O$ which is an order of magnitude less than a corresponding fluidized bed gas scrubber.

It has been found by the present applicants that a fine fraction of less than 45 microns bears, adsorbs or chemisorbs a disproportionate amount of, in particular, trace metals.

FIGS. 9, 10, 11 and 12 illustrates the level of iron vanadium, nickel and gallium, respectively, in parts per million (Y axis) as a function of particle size (X axis).

In the adsorption or chemisorption of gaseous fluorides from the exhaust gas of an aluminum refining cell onto alumina, both the fluorides and treated alumina are used as feeds for the refining cell. Trace metals such as gallium, nickel, iron and vanadium are present in the exhaust gas and are considered contaminants. These trace impurities are usually present in the form of condensed fume and report to the fine fraction removed from the contacter with the exhaust gas.

To prevent these trace metals being returned to the refining cell with the treated alumina, the fine fraction which has a disproportionately higher fraction of trace metals, is recovered and not used as feed for the refining cell. From FIGS. 9 to 12 it is evident that the less than 10 micron fraction has the largest proportion of trace metals but it can be seen that benefits can be gained by separating a fine fraction of up to 45 microns.

Table 1 shows the reduction in impurity levels which were obtained by removal of alumina with a particle size of 20 microns and alumina with a particle size of less than 45 microns.

TABLE 1

| Element | Size Fraction Removed (micron) | Wt % Alumina | % Impurity Removed |
|---|---|---|---|
| V | −20 | 20 | 47 |
|   | −45 | 25 | 55 |
| Ni | −20 | 20 | 53 |
|   | −45 | 25 | 60 |
| Fe | −20 | 20 | 17 |
|   | −45 | 25 | 20 |

It can be seen that the benefits of separating the fine fraction are most noticeable with respect to vanadium and nickel.

While the invention has been described mainly in terms of the removal of gaseous fluorides from aluminum cell exhaust gases by contact with alumina, it should be readily understood by those skilled in the art that the process of the invention is equally applicable to other gas scrubbing or gas solid contacting applications which are dependent on the rate of diffusion to the adsorbing or chemisorbing particle. For example, a further application may be in the desulphurization of flue or process gases. Such gases containing sulphur in the form of sulphur dioxide or other oxide species must first be treated prior to venting to minimize harmful effects on the environment prior to release. In common practice treatment may be performed in wet or dry scrubbers. In these cases the solid contact medium may be lime or hydrated lime or zinc oxide. Reduction of the diffusion layer around the particles would increase the level of reaction rate and efficiencies.

In order to quantify some of the operating parameters used in the present invention, experimental runs using a cold linear model of the apparatus shown in FIG. 1 where conducted. Gas velocities were measured using a hot wire anemometer. Particulate velocities were determined using a proprietary laser based product. The alumina used was a regular smelter grade feed product. The two specific volumetric throughputs investigated in these experiments were selected to cover the typical range used in full scale operation. Particle size distributions were determined using a Malvern particle size analyzer.

The values for bed voidage, gas velocity and particle velocity are shown in Table 2 below.

TABLE 2

| Experimental Run | Bed Voidage | Circumferential Gas Velocity (m/sec) | Particulate Velocity (m/s) | Differential (Slip) Velocity (m/s) |
|---|---|---|---|---|
| 1 | 0.9999 | 12.7 | 8.6 | 4.1 |
| 2 | 0.9997 | 5.9 | 2.8 | 3.1 |

In the above Table a bed voidage of 1.00 is 100% voidage (i.e. no solids). In experimental run 1, the gas stream had an average residence time in the reaction zone of 0.01 seconds. In experimental run 2, the gas stream has an average residence time in the reaction zone of 0.02 seconds. It will be appreciated that the average residence time of the gas stream in the reaction zone is equivalent to the contact time between the gas stream and the particulate alumina.

The particle size distribution of the particulate alumina is given in Table 3. The $d_{50}$ is around 85 μm.

TABLE 3

| High Size (Largest Dimension) (microns) | Mass % Under |
|---|---|
| 190 | 98.2 |
| 164 | 96.1 |
| 142 | 92.4 |
| 123 | 86.1 |
| 106 | 75.9 |
| 92 | 61.9 |
| 79 | 45 |
| 68 | 28.4 |
| 59 | 16.8 |
| 57 | 10.8 |
| 44 | 7.6 |
| 38 | 5.4 |
| 33 | 3.4 |
| 29 | 1.7 |
| 25 | 0.8 |

We claim:

1. A process for removing an HF or sulfur dioxide contaminant from an exhaust gas stream containing at least one of said contaminant comprising
providing said gas stream to a reaction zone, said gas stream entering said reaction zone from underneath and being caused to flow through said reaction zone with components of velocity in substantially upwards and circumferential directions;
contacting said gas stream in said reaction zone with particulate material to adsorb said contaminant on said particulate material, wherein the flow of gas in said reaction zone causes a dispersed toroidal bed of particulate material to be formed in said reaction zone;
wherein the slip velocity of said gas stream relative to said particulate material in said toroidal bed is greater than 1 m/s;
entraining a fine fraction of said particulate material in said gas stream whereby said fine fraction is removed from said toroidal bed by said gas stream exiting said bed; and
separately recovering a coarse fraction of said particulate material from the reaction zone.

2. A process for removing a carbon dioxide contaminant from an exhaust gas stream containing said contaminant comprising
providing said gas stream to a reaction zone, said gas stream entering said reaction zone from underneath and being caused to flow through said reaction zone with components of velocity in substantially upwards and circumferential directions;
contacting said gas stream in said reaction zone with particulate material to adsorb said contaminant on said particulate material, wherein the flow of gas in said reaction zone causes a dispersed toroidal bed of particulate material to be formed in said reaction zone;
wherein the slip velocity of said gas stream relative to said particulate material in said toroidal bed is greater than 1 m/s;
entraining a fine fraction of said particulate material in said gas stream whereby said fine fraction is removed from said toroidal bed by said gas stream exiting said bed; and
separately recovering a coarse fraction of said particulate material from the reaction zone.

3. A process as claimed in claim 1 or 2 wherein said toroidal bed has a bed voidage of from 0.950 to 0.9999.

4. A process as claimed in claim 3 wherein said toroidal bed has a bed voidage in the range of about 0.9997 to about 0.9999.

5. A process as claimed in claim 1 or 2 wherein the particulate material has a $d_{50}$ in the range of about 70 µm to about 100 µm.

6. A process as claimed in claim 4 wherein the particulate material has a $d_{50}$ particle size of about 85 µm.

7. A process as claimed in claim 1 or 2 wherein said slip velocity in said reaction zone is within the range of about 3 m/s to about 5 m/s.

8. A process as claimed in claim 1 or 3 wherein said fine fraction of particulate material entrained with said gas stream has particle sizes of predominantly below about 45 µm.

9. A process as claimed in claim 1 or 3 wherein said fine fraction has particle sizes of predominantly below about 20 µm.

10. A process as claimed in claim 1 or 3 wherein said gas stream flows through a set of angled vanes as it enters said reaction zone and said set of angled vanes imparts said gas stream with said components of velocity in the upwards and circumferential directions.

11. A process as claimed in claim 1 or 3 wherein said particulate material has an average residence time in said reaction zone of from 2 minutes to about 10 minutes.

12. A process as claimed in claim 1 or 3 wherein said gas stream has an average residence time in the reaction zone of up to 0.5 seconds.

13. A process as claimed in claim 12 wherein the average residence time of the gas stream in the reaction zone is from about 0.01 to about 0.10 second.

14. A process as claimed in claim 12 wherein the average residence time of the gas stream in the reaction zone is from about 0.01 to about 0.02 seconds.

15. A process as claimed in claim 1 wherein said contaminant is further admixed with carbon dioxide.

16. A process as claimed in claim 1 or 3 wherein said particulate material is at least one of alumina and lime.

17. A process as claimed in claim 1 wherein said acid contaminant is hydrogen fluoride in an exhaust gas stream from an aluminum smelter and said particulate material is alumina.

18. A process as claimed in claim 17 wherein coarse fraction of alumina recovered from said reaction zone is used as a feed to an aluminum smelting cell.

19. A process as claimed in claim 1 or 3 wherein said particulate material being fed to said reaction zone has particle sizes at least 90% of which are below about 190 µm.

20. A process as claimed in claim 1 or 3 wherein said fine particulate material has particle sizes of less than about 45 µm, and said coarser particulate material has particle sizes of greater than about 45 µm.

* * * * *